(12) United States Patent
Li et al.

(10) Patent No.: US 10,926,655 B2
(45) Date of Patent: Feb. 23, 2021

(54) CHARGING PILE

(71) Applicant: Huawei Technologies Co., Ltd., Shenzhen (CN)

(72) Inventors: Nanhai Li, Dongguan (CN); Zhen Qin, Shenzhen (CN); Hongbing Wang, Dongguan (CN); Quanfu Shi, Shenzhen (CN); Yongjin Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/363,564

(22) Filed: Mar. 25, 2019

(65) Prior Publication Data

US 2019/0217734 A1 Jul. 18, 2019

Related U.S. Application Data

(63) Continuation of application No. PCT/CN2017/103378, filed on Sep. 26, 2017.

(30) Foreign Application Priority Data

Sep. 26, 2016 (CN) .......................... 201610851503.9

(51) Int. Cl.
*B60L 53/31* (2019.01)
*H02J 7/00* (2006.01)
(Continued)

(52) U.S. Cl.
CPC ............... *B60L 53/31* (2019.02); *B60L 53/11* (2019.02); *B60L 53/14* (2019.02); *B60L 53/16* (2019.02);
(Continued)

(58) Field of Classification Search
CPC ................................................... H02J 7/0024
(Continued)

(56) References Cited

U.S. PATENT DOCUMENTS 9,868,357 B2 * 1/2018 McCalmont ............ H02J 3/383
2011/0202197 A1 8/2011 Hachiya et al.
(Continued)

FOREIGN PATENT DOCUMENTS

CN 203522271 U 4/2014
CN 104467017 A 3/2015
(Continued)

OTHER PUBLICATIONS

EP/17852445.0-1205, Office Action, dated Nov. 19, 2020.

*Primary Examiner* — Edward Tso
*Assistant Examiner* — Ahmed H Omar
(74) *Attorney, Agent, or Firm* — Leydig, Voit & Mayer, Ltd.

(57) ABSTRACT

A charging pile includes a power system and a charging terminal. The power system includes a first power unit, a second power unit, a power control unit, and a heat sink. The first power unit is connected to the second power unit, and the first power unit and the second power unit have same output voltages and same output currents. The power control unit is configured to control the output voltages and the output currents of the two power units. The charging terminal includes a charging control module, a direct-current distribution unit, and a charging plug. The charging plug is configured to connect to a to-be-charged battery and charge the to-be-charged battery. The direct-current distribution unit is configured to allocate a power supply to the charging plug. The charging control module is configured to bill and display the charging.

16 Claims, 6 Drawing Sheets

(51) Int. Cl.
*B60L 53/10* (2019.01)
*B60L 53/30* (2019.01)
*B60L 53/22* (2019.01)
*B60L 53/14* (2019.01)
*B60L 53/53* (2019.01)
*B60L 53/66* (2019.01)
*B60L 53/302* (2019.01)
*B60L 53/62* (2019.01)
*B60L 53/16* (2019.01)

(52) U.S. Cl.
CPC .............. *B60L 53/22* (2019.02); *B60L 53/302* (2019.02); *B60L 53/305* (2019.02); *B60L 53/53* (2019.02); *B60L 53/62* (2019.02); *B60L 53/66* (2019.02); *B60L 53/665* (2019.02); *H02J 7/0024* (2013.01); *Y02T 10/70* (2013.01)

(58) Field of Classification Search
USPC .......................................................... 320/104
See application file for complete search history.

(56) References Cited

U.S. PATENT DOCUMENTS

| 2013/0069588 A1* | 3/2013 | Oda .................. B60L 53/18 320/109 |
| 2016/0101704 A1 | 4/2016 | McCalmont et al. |
| 2016/0176305 A1 | 6/2016 | James et al. |

FOREIGN PATENT DOCUMENTS

| CN | 204290435 | 4/2015 |
| CN | 104882922 A | 9/2015 |
| CN | 105119334 A | 12/2015 |
| CN | 205212459 U | 5/2016 |
| CN | 205595816 U | 9/2016 |
| CN | 106364348 A | 2/2017 |
| EP | 2110923 A1 | 10/2009 |
| JP | 2008199752 A | 8/2008 |
| JP | 2013192310 A | 9/2013 |
| WO | 2013137232 A1 | 9/2013 |
| WO | 2014207267 A1 | 12/2014 |

* cited by examiner

CHARGING PILE

CROSS-REFERENCE TO RELATED APPLICATIONS

This application is a continuation of International Application No. PCT/CN2017/103378, filed on Sep. 26, 2017, which claims priority to Chinese Patent Application No. 201610851503.9, filed on Sep. 26, 2016. The disclosures of the aforementioned applications are hereby incorporated by reference in their entireties.

TECHNICAL FIELD

The present invention relates to the energy field, and in particular, to a charging pile.

BACKGROUND

Figure 1:
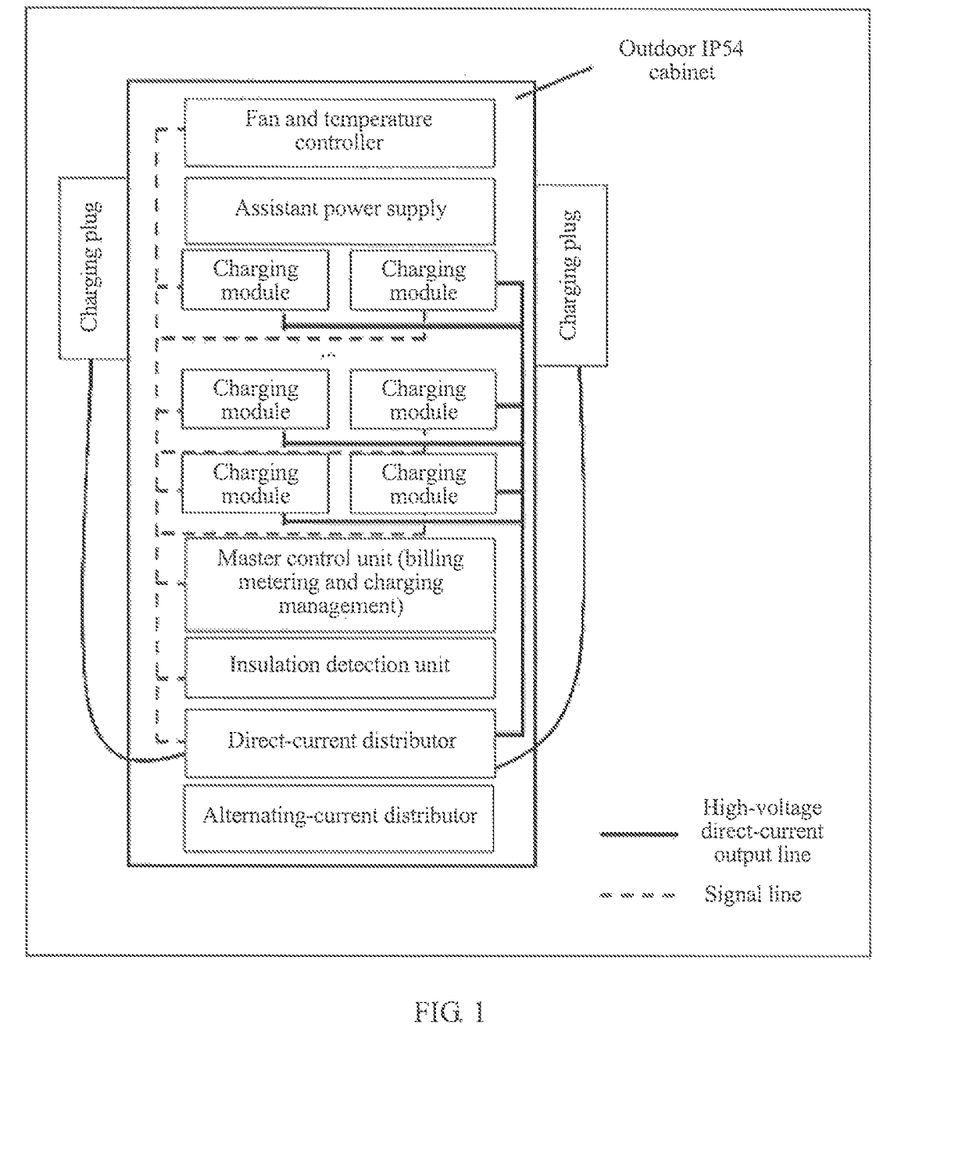
FIG. 1 shows a pile-plug-unified charging pile in the prior art.
Figure 2:
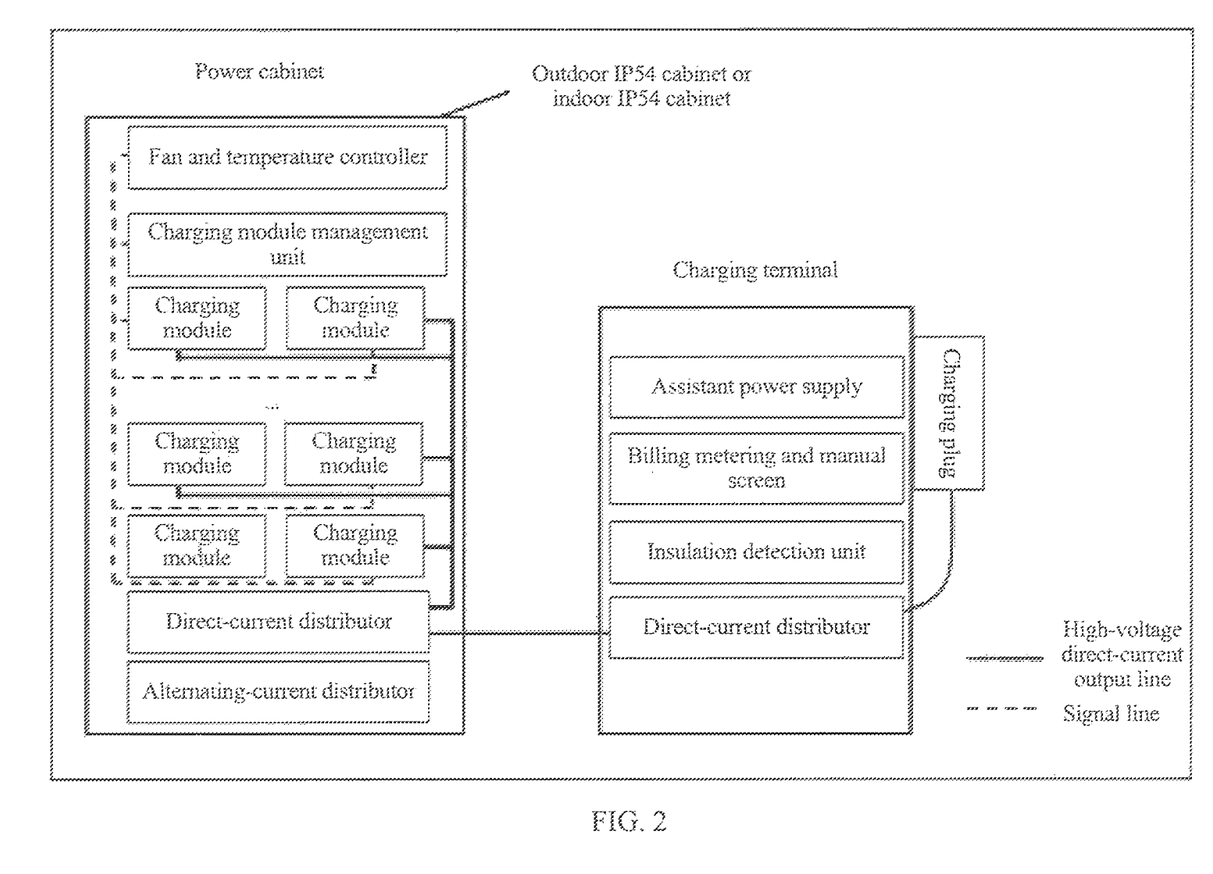
FIG. 2 shows a pile-plug-split charging pile in the prior art.

With extensive use of electric vehicles, charging piles are widely deployed. The charging piles are classified into an alternating-current charging pile and a direct-current charging pile. Direct-current charging piles are classified into a pile-plug-unified charging pile and a pile-plug-split charging pile according to different forms of the direct-current charging piles. As shown in FIG. 1, the pile-plug-unified charging pile mainly includes an IP54 outdoor cabinet, an alternating-current distributor, a direct-current distributor, an insulation detection unit, a master control unit (billing metering and charging management), a charging module, an assistant power supply, a fan, a temperature controller, a charging plug, and the like. As shown in FIG. 2, the pile-plug-split charging pile generally includes two parts: a power cabinet and a charging terminal. An outdoor cabinet with at least a protection level IP54 is required if the power cabinet is deployed outdoors, and if the power cabinet is deployed indoors, the power cabinet needs to be deployed in a dedicated equipment room. The power cabinet is mainly deployed with a charging module, so as to implement conversion from an alternating current to a direct current. The charging terminal is generally deployed outdoors and includes a charging plug, a billing metering function and a human-machine interface, an assistant power supply, an insulation detection unit, a direct-current distributor, and the like.

Direct-current charging piles shown in both FIG. 1 and FIG. 2 use conventional charging modules, and these charging modules are deployed on a fixed subrack and perform output under the control of a master control unit or a charging module management unit by using a backboard design. Output voltages of all charging modules are the same during working. A maximum output voltage of a charging pile is determined by a maximum output voltage of a single charging module. A maximum output current of a charging pile is a sum of output currents of all charging modules.

A higher charging voltage is required as a charging voltage of an electric vehicle increases. That is, a charging module needs to have a higher voltage and a wider output voltage range. For example, currently, output voltages of most charging modules range from 200 V to 500 V or 300 V to 750 V. If the voltage required by the electric vehicle is up to 900 V in the future, the output voltage of the charging module needs to range from 200 V to 900 V in an existing architecture. Such a wide voltage range of the charging module is difficult to be implemented, and costs also increase; in addition, the charging module works in a non-optimal state for most of the time, and this causes low efficiency and high energy consumption. Furthermore, a charging current is an important indicator for a future charging pile, a fast charging current is equivalent to a large charging current, and more charging modules need to be connected in parallel. However, in an existing charging pile architecture, once a design of an existing charging pile is completed, a charging module quantity and a system heat dissipation capability of the charging pile are determined, and a maximum output power is limited by a slot quantity of a charging module. Consequently, a capacity cannot be expanded, and a requirement for future power expansion cannot be met.

In addition, when the existing charging pile is deployed outdoors, in consideration of a heat dissipation requirement and a waterproof requirement, a cabinet needs to use at least an IP54 protection design. Heat consumption of the charging pile is large, and currently, heat is usually dissipated in a direct ventilation manner in which a dust filter is used. Consequently, dust and oil stains are easily inhaled into the cabinet when the heat is dissipated in the direct ventilation manner, resulting in an extremely high annualized failure rate and low reliability of a charging module. Additionally, because the dust filter designed in the direct ventilation manner needs to be replaced regularly, maintenance costs are extremely high.

SUMMARY

Embodiments of the present invention provide a charging pile, so as to meet an increasingly high requirement of an electric vehicle for a charging voltage and a charging current.

According to a first aspect, an embodiment of the present invention provides a charging pile, including a power system and a charging terminal.

The power system includes a first power unit, a second power unit, a power control unit, a heat sink, a first switch transistor, a second switch transistor, and a third switch transistor. The first power unit and the second power unit have a same output voltage value U and a same output current value I. The power control unit is configured to control output voltages and output currents of the first power unit and the second power unit. The first switch transistor, the second switch transistor, and the third switch transistor are configured to implement a serial connection or a parallel connection between the first power unit and the second power unit. The heat sink is configured to dissipate heat of the power system.

The charging terminal includes a charging control module, a direct-current distribution unit, and a charging plug. The charging plug is configured to connect to a to-be-charged battery and charge the to-be-charged battery, the direct-current distribution unit is configured to allocate a power supply to the charging plug, and the charging control module is configured to bill and display the charging.

The charging pile provided in this embodiment of the present invention includes the first power unit, the second power unit, the power control unit, and the like, and the two power units are connected in series or in parallel by using the three switch transistors to provide a flexible charging voltage and a flexible charging current for the to-be-charged battery. In this way, an existing difficulty in capacity expansion of a charging pile is overcome, and an increasingly high requirement of an electric vehicle for a charging voltage and a charging current is met.

With reference to the first aspect, in a first possible implementation of the first aspect, a first end of the first switch transistor is connected to a first end of the first power unit and the direct-current distribution unit, a second end of the first switch transistor is connected to a first end of the second power unit, a first end of the second switch transistor is connected to a second end of the first power unit, a second end of the second switch transistor is connected to the first end of the second power unit and the second end of the first switch transistor, a first end of the third switch transistor is connected to the second end of the first power unit and the first end of the second switch transistor, and a second end of the third switch transistor is connected to a second end of the second power unit and the direct-current distribution unit.

Serial and parallel connections between the two power units can be flexibly implemented when the three switch transistors are connected in the foregoing manner, so that a charging voltage and a charging current of the charging pile can be flexibly expanded.

With reference to the first possible implementation of the first aspect, in a second possible implementation of the first aspect, the charging pile includes three working modes:

a first working mode: a charging mode in which the first power unit and the second power unit are connected in parallel;

a second working mode: a charging mode in which the first power unit and the second power unit are connected in series; and a third working mode: a hybrid charging mode in which the first power unit and the second power unit are first connected in parallel and then are connected in series.

The charging pile in the three different working modes provides different services for the to-be-charged battery according to different requirements. When a requirement of a to-be-charged battery of an electric vehicle for a charging voltage and a charging current changes, the charging pile may correspondingly act based on the three different working modes.

With reference to the second possible implementation of the first aspect, in a third possible implementation of the first aspect, when the charging plug is connected to the to-be-charged battery, the charging control module communicates with a battery management system (BMS) of the to-be-charged battery and identifies a charging voltage of the to-be-charged battery and a charging current required by the to-be-charged battery; and when a range of the charging voltage falls within a value range of U and the charging current required by the to-be-charged battery is greater than or equal to a first preset threshold, the charging control module communicates with the power control unit, and the power control unit controls the second switch transistor to be opened and controls the first switch transistor and the third switch transistor to be closed, so that the charging pile enters the first working mode.

With reference to the second possible implementation of the first aspect, in a fourth possible implementation of the first aspect, when the charging plug is connected to the to-be-charged battery, the charging control module communicates with a battery management system BMS of the to-be-charged battery and identifies a charging voltage of the to-be-charged battery and a charging current required by the to-be-charged battery; and when a range of the charging voltage exceeds a value range of U and is less than an output voltage obtained after the first power unit and the second power unit are connected in series, and the charging current required by the to-be-charged battery is less than I, the charging control module communicates with the power control unit, and the power control unit controls the second switch transistor to be closed and controls the first switch transistor and the third switch transistor to be opened, so that the charging pile enters the second working mode.

With reference to the second possible implementation of the first aspect, in a fifth possible implementation of the first aspect, when the charging plug is connected to the to-be-charged battery, the charging control module communicates with a battery management system BMS of the to-be-charged battery and identifies a charging voltage of the to-be-charged battery and a charging current required by the to-be-charged battery; when a range of the charging voltage exceeds a value range of U and the charging current required by the to-be-charged battery is greater than I, the charging control module communicates with the power control unit, and the power control unit controls the second switch transistor to be opened and controls the first switch transistor and the third switch transistor to be closed, so that the first power unit and the second power unit perform output in parallel, and the power control unit adjusts the output voltages of the first power unit and the second power unit; and when the charging voltage of the to-be-charged battery reaches a maximum value of U, the power control unit controls the first switch transistor and the third switch transistor to be opened and controls the second switch transistor to be closed, so that the first power unit and the second power unit perform output in series, and the charging pile enters the third working mode.

With reference to any one of the foregoing possible implementations of the first aspect, in a sixth possible implementation of the first aspect, both a power heater of the first power unit and a power heater of the second power unit are mounted on the heat sink.

In the charging pile provided in this embodiment of the present invention, heat can be dissipated by using the heat sink without a need to dispose a fan inside the whole system. Compared with existing direct ventilation for heat dissipation, heat dissipation performed in this manner does not require a dust filter. Therefore, costs can be further reduced on the basis of implementation of natural heat dissipation of the whole system.

With reference to any one of the foregoing possible implementations of the first aspect, in a seventh possible implementation of the first aspect, the power system is protected by using an IP65 protection design.

Compared with a conventional charging pile using an IP54 protection design, the charging pile provided in this embodiment of the present invention uses the IP65 protection design, so as to improve reliability and reduce maintenance costs.

With reference to any one of the foregoing possible implementations of the first aspect, in an eighth possible implementation of the first aspect, the charging pile includes at least two power systems.

In this way, a capacity of the charging pile can be expanded, so that the charging pile can meet an increasingly high requirement for a charging voltage and a charging current.

According to a second aspect, an embodiment of the present invention provides a charging pile, including a power system and a charging terminal.

The power system includes a first power unit, a second power unit, a power control unit, and a heat sink. The first power unit is connected to the second power unit, and the first power unit and the second power unit have a same output voltage value U and a same output current value I. The power control unit is configured to control output voltages and output currents of the first power unit and the second power unit.

The charging terminal includes a charging control module, a direct-current distribution unit, and a charging plug. The charging plug is configured to connect to a to-be-charged battery and charge the to-be-charged battery, the direct-current distribution unit is configured to allocate a power supply to the charging plug, and the charging control module is configured to bill and display the charging.

The charging pile provided in this embodiment of the present invention includes the first power unit, the second power unit, the power control unit, and the like, and the two power units are connected to provide a flexible charging voltage and a flexible charging current for the to-be-charged battery. In this way, an existing difficulty in capacity expansion of a charging pile is overcome, and an increasingly high requirement of an electric vehicle for a charging voltage and a charging current is met.

With reference to the second aspect, in a first possible implementation of the second aspect, the first power unit and the second power unit are connected in parallel, or the first power unit and the second power unit are connected in series.

The charging pile provided in this embodiment of the present invention includes the first power unit, the second power unit, the power control unit, and the like, and the two power units are connected in series or in parallel to provide a flexible charging voltage and a flexible charging current for the to-be-charged battery. In this way, an existing difficulty in capacity expansion of a charging pile is overcome, and an increasingly high requirement of an electric vehicle for a charging voltage and a charging current is met.

With reference to the first possible implementation of the second aspect, in a second possible implementation of the second aspect, the charging pile further includes a first switch transistor, a second switch transistor, and a third switch transistor. The first switch transistor, the second switch transistor, and the third switch transistor are configured to implement a serial connection or a parallel connection between the first power unit and the second power unit. A first end of the first switch transistor is connected to a first end of the first power unit and the direct-current distribution unit, a second end of the first switch transistor is connected to a first end of the second power unit, a first end of the second switch transistor is connected to a second end of the first power unit, a second end of the second switch transistor is connected to the first end of the second power unit and the second end of the first switch transistor, a first end of the third switch transistor is connected to the second end of the first power unit and the first end of the second switch transistor, and a second end of the third switch transistor is connected to a second end of the second power unit and the direct-current distribution unit.

Serial and parallel connections between the two power units can be flexibly implemented when the three switch transistors are connected in the foregoing manner, so that a charging voltage and a charging current of the charging pile can be flexibly expanded.

It should be noted that the three switch transistors may be disposed inside the power system, or may be disposed outside the power system as a switch module similar to a switch box. This is not limited in this embodiment of the present invention.

With reference to the second possible implementation of the second aspect, in a third possible implementation of the second aspect, the charging pile includes three working modes:

a first working mode: a charging mode in which the first power unit and the second power unit are connected in parallel;

a second working mode: a charging mode in which the first power unit and the second power unit are connected in series; and a third working mode: a hybrid charging mode in which the first power unit and the second power unit are first connected in parallel and then are connected in series.

The charging pile in the three different working modes provides different services for the to-be-charged battery according to different requirements. When a requirement of a to-be-charged battery of an electric vehicle for a charging voltage and a charging current changes, the charging pile may correspondingly act based on the three different working modes.

With reference to the third possible implementation of the second aspect, in a fourth possible implementation of the second aspect, when the charging plug is connected to the to-be-charged battery, the charging control module communicates with a battery management system (BMS) of the to-be-charged battery and identifies a charging voltage of the to-be-charged battery and a charging current required by the to-be-charged battery; and when a range of the charging voltage falls within a value range of U and the charging current required by the to-be-charged battery is greater than or equal to a first preset threshold, the charging control module communicates with the power control unit, and the power control unit controls the second switch transistor to be opened and controls the first switch transistor and the third switch transistor to be closed, so that the charging pile enters the first working mode.

With reference to the third possible implementation of the second aspect, in a fifth possible implementation of the second aspect, when the charging plug is connected to the to-be-charged battery, the charging control module communicates with a battery management system BMS of the to-be-charged battery and identifies a charging voltage of the to-be-charged battery and a charging current required by the to-be-charged battery; and when a range of the charging voltage exceeds a value range of U and is less than an output voltage obtained after the first power unit and the second power unit are connected in series, and the charging current required by the to-be-charged battery is less than I, the charging control module communicates with the power control unit, and the power control unit controls the second switch transistor to be closed and controls the first switch transistor and the third switch transistor to be opened, so that the charging pile enters the second working mode.

With reference to the third possible implementation of the second aspect, in a sixth possible implementation of the second aspect, when the charging plug is connected to the to-be-charged battery, the charging control module communicates with a battery management system BMS of the to-be-charged battery and identifies a charging voltage of the to-be-charged battery and a charging current required by the to-be-charged battery; when a range of the charging voltage exceeds a value range of U and the charging current required by the to-be-charged battery is greater than I, the charging control module communicates with the power control unit, and the power control unit controls the second switch transistor to be opened and controls the first switch transistor and the third switch transistor to be closed, so that the first power unit and the second power unit perform output in parallel, and the power control unit adjusts the output voltages of the first power unit and the second power unit; and when the charging voltage of the to-be-charged battery reaches a maximum value of U, the power control unit controls the first switch transistor and the third switch transistor to be opened and controls the second switch transistor to be closed, so that the first power unit and the second power unit perform output in series, and the charging pile enters the third working mode.

With reference to any one of the foregoing possible implementations of the second aspect, in a seventh possible implementation of the second aspect, the power system is protected by using an IP65 protection design.

Compared with a conventional charging pile using an IP54 protection design, the charging pile provided in this embodiment of the present invention uses the IP65 protection design, so as to improve reliability and reduce maintenance costs.

With reference to any one of the foregoing possible implementations of the second aspect, in an eighth possible implementation of the second aspect, the charging pile includes at least two power systems.

In this way, a capacity of the charging pile can be expanded, so that the charging pile can meet an increasingly high requirement for a charging voltage and a charging current.

BRIEF DESCRIPTION OF DRAWINGS

To describe technical solutions in embodiments of the present invention more clearly, the following briefly describes the accompanying drawings. The accompanying drawings in the following description show merely some exemplary embodiments of the present invention, and a person of ordinary skill in the art may still derive other drawings from these accompanying drawings without creative efforts.

DESCRIPTION OF EMBODIMENTS

To make a person skilled in the art understand technical solutions of the present invention better, the following clearly describes technical solutions in embodiments of the present invention with reference to the accompanying drawings. The described embodiments are merely a part rather than all of the embodiments of the present invention. Other embodiments obtained by a person of ordinary skill in the art based on the described embodiments of the present invention without creative efforts may fall within the protection scope of the present invention.

It should be further understood that, although terms such as "first" and "second" may be used in this specification to describe various components, but these terms are merely used to distinguish between the components or other related objects. For example, without departing from the scope of the present invention, a first power unit may also be referred to as a second power unit, and similarly, the second power unit may also be referred to as the first power unit.

The terms used in the description of the present invention are merely for the purpose of illustrating exemplary embodiments, and are not intended to limit the present invention. The terms "a", "said" and "the" of singular forms used in the specification and the appended claims of the present invention are also intended to include plural forms, unless otherwise specified in the context clearly. It should also be understood that, the term "and/or" used in the specification indicates and includes any or all possible combinations of one or more associated features.

Figure 3:
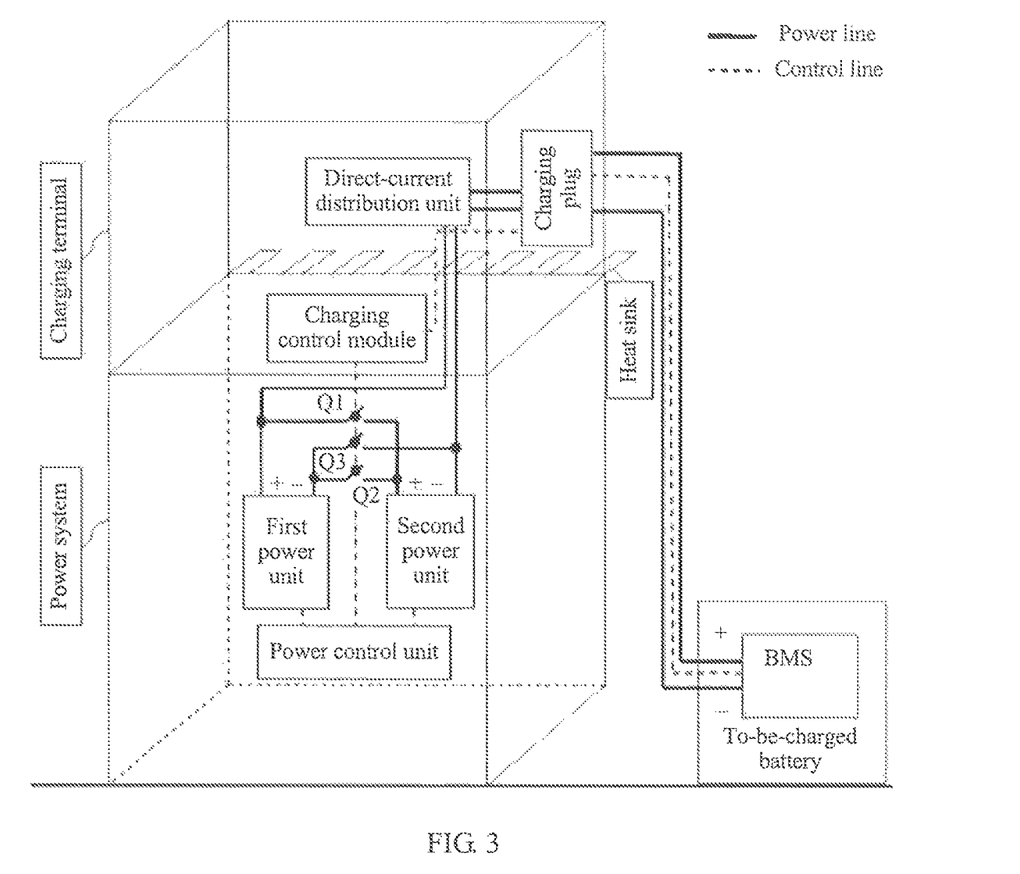
FIG. 3 shows a structural diagram of a charging pile according to an embodiment of the present invention.

FIG. 3 shows a charging pile according to Embodiment 1 of the present invention. The charging pile includes a power system and a charging terminal.

The power system includes a first power unit, a second power unit, a power control unit, a heat sink, a first switch transistor Q1, a second switch transistor Q2, and a third switch transistor Q3. The first power unit and the second power unit have a same output voltage value U and a same output current value I. The power control unit is configured to control output voltages and output currents of the first power unit and the second power unit. The first switch transistor Q1, the second switch transistor Q2, and the third switch transistor Q3 are configured to implement a serial connection or a parallel connection between the first power unit and the second power unit. The heat sink is configured to dissipate heat of the power system.

The charging terminal includes a charging control module, a direct-current distribution unit, and a charging plug. The charging plug is configured to connect to a to-be-charged battery and charge the to-be-charged battery, the direct-current distribution unit is configured to allocate a power supply to the charging plug, and the charging control module is configured to bill and display the charging.

The charging pile provided in Embodiment 1 of the present invention includes the first power unit, the second power unit, the power control unit, and the like, and the two power units are connected in series or in parallel by using the three switch transistors to provide a flexible charging voltage and a flexible charging current for the to-be-charged battery. In this way, an existing difficulty in capacity expansion of a charging pile is overcome, and an increasingly high requirement of an electric vehicle for a charging voltage and a charging current is met.

A power line shown in the diagram is used to transmit a current signal, and a control line shown in the diagram is used to transmit control signaling. This is the same as that in the following diagrams and is not described in detail again.

On the basis of Embodiment 1, further, a first end of the first switch transistor Q1 is connected to a first end of the first power unit and the direct-current distribution unit, a second end of the first switch transistor Q1 is connected to a first end of the second power unit, a first end of the second switch transistor Q2 is connected to a second end of the first power unit, a second end of the second switch transistor Q2 is connected to the first end of the second power unit and the second end of the first switch transistor Q1, a first end of the third switch transistor Q3 is connected to the second end of the first power unit and the first end of the second switch transistor Q2, and a second end of the third switch transistor Q3 is connected to a second end of the second power unit and the direct-current distribution unit.

Serial and parallel connections between the two power units can be flexibly implemented when the three switch transistors are connected in the foregoing manner, so that a charging voltage and a charging current of the charging pile can be flexibly expanded.

More specifically, the charging pile provided in Embodiment 1 includes three working modes:

a first working mode: a charging mode in which the first power unit and the second power unit are connected in parallel;

a second working mode: a charging mode in which the first power unit and the second power unit are connected in series; and a third working mode: a hybrid charging mode in which the first power unit and the second power unit are first connected in parallel and then are connected in series.

The charging pile in the three different working modes provides different services for the to-be-charged battery according to different requirements. When a requirement of a to-be-charged battery of an electric vehicle for a charging voltage and a charging current changes, the charging pile may correspondingly act based on the three different working modes.

The following separately describes trigger conditions and specific control logic of the three different working modes.

1. When the charging plug is connected to the to-be-charged battery, the charging control module communicates with a battery management system (BMS) of the to-be-charged battery and identifies a charging voltage of the to-be-charged battery and a charging current required by the to-be-charged battery; and when a range of the charging voltage falls within a value range of U and the charging current required by the to-be-charged battery is greater than or equal to a first preset threshold, the charging control module communicates with the power control unit, and the power control unit controls the second switch transistor Q2 to be opened and controls the first switch transistor Q1 and the third switch transistor Q3 to be closed, so that the charging pile enters the first working mode.

In addition, the power control unit adjusts the output voltages and the output currents of the first power unit and the second power unit, so that the to-be-charged battery is charged with a large current (greater than or equal to the first preset threshold), and the to-be-charged battery can be quickly fully charged. In the charging process, the currents of the first power unit and the second power unit need to be equal to maintain load balance. After the charging ends, all of the first switch transistor Q1, the second switch transistor Q2, and the third switch transistor Q3 are opened.

2. Alternatively, when the charging plug is connected to the to-be-charged battery, the charging control module communicates with a battery management system BMS of the to-be-charged battery and identifies a charging voltage of the to-be-charged battery and a charging current required by the to-be-charged battery; and when a range of the charging voltage exceeds a value range of U and is less than an output voltage obtained after the first power unit and the second power unit are connected in series, and the charging current required by the to-be-charged battery is less than I, the charging control module communicates with the power control unit, and the power control unit controls the second switch transistor Q2 to be closed and controls the first switch transistor Q1 and the third switch transistor Q3 to be opened, so that the charging pile enters the second working mode.

In addition, the power control unit adjusts the output voltages and the output currents of the first power unit and the second power unit, so as to meet a charging requirement of the to-be-charged battery. In the charging process, the output voltages of the first power unit and the second power unit are the same to maintain load balance. After the charging ends, all of the first switch transistor Q1, the second switch transistor Q2, and the third switch transistor Q3 are opened.

3. Alternatively, when the charging plug is connected to the to-be-charged battery, the charging control module communicates with a battery management system BMS of the to-be-charged battery and identifies a charging voltage of the to-be-charged battery and a charging current required by the to-be-charged battery; when a range of the charging voltage exceeds a value range of U and the charging current required by the to-be-charged battery is greater than I, the charging control module communicates with the power control unit, and the power control unit controls the second switch transistor Q2 to be opened and controls the first switch transistor Q1 and the third switch transistor Q3 to be closed, so that the first power unit and the second power unit perform output in parallel, and the power control unit adjusts the output voltages and the output currents of the first power unit and the second power unit; and when the charging voltage of the to-be-charged battery reaches a maximum value of U, the power control unit controls the first switch transistor Q1 and the third switch transistor Q3 to be opened and controls the second switch transistor Q2 to be closed, so that the first power unit and the second power unit perform output in series, and the charging pile enters the third working mode. The output current is adjusted, so that the output current can satisfy the charging current required by the to-be-charged battery, and furthermore, it can be ensured that the output current does not exceed a capacity of the to-be-charged battery.

In addition, the power control unit adjusts the output voltages and the output currents of the first power unit and the second power unit, so as to meet a charging requirement of the to-be-charged battery. In the charging process, the output voltages of the first power unit and the second power unit are the same to maintain load balance. After the charging ends, all of the first switch transistor Q1, the second switch transistor Q2, and the third switch transistor Q3 are opened.

In comparison with a conventional solution, in the foregoing three working modes, output voltages and output currents of different power units can be flexibly combined, so as to make full use of the power units and enable the charging pile to work in an optimal state with lowest costs. Based on the above, when to-be-charged batteries of different electric vehicles have different requirements for a charging voltage and a charging current, the charging control module identifies the requirements of the to-be-charged batteries and controls the three switch transistors according to specific requirements of the to-be-charged batteries. In this way, the two power units of the charging pile are connected in different manners, so that the charging pile enters a corresponding working mode in the three working modes, so as to charge the to-be-charged batteries.

It should be noted that the charging terminal of the charging pile provided in Embodiment 1 may be disposed on the top or one side of the power system and form a unified charging pile with the power system, or may be independently disposed on the ground and form a split charging pile with the power system. This is not limited in this solution.

In addition, in the charging pile provided in Embodiment 1, the first switch transistor Q1, the second switch transistor Q2, and the third switch transistor Q3 may be any one of a MOSFET (metal-oxide-semiconductor field-effect transistor), an IGBT (insulated-gate bipolar transistor), a contactor, or a relay, provided that the first switch transistor Q1, the second switch transistor Q2, and the third switch transistor Q3 can cooperate to implement serial and parallel connections between the first power unit and the second power unit. Specific forms of the first switch transistor Q1, the second switch transistor Q2, and the third switch transistor Q3 are not limited in this solution.

Further, in the charging pile provided in Embodiment 1, both a power heater of the first power unit and a power heater of the second power unit are mounted on the heat sink. In this way, heat can be dissipated by using the heat sink without a need to dispose a fan inside the whole system. Compared with existing direct ventilation for heat dissipation, heat dissipation performed in this manner does not require a dust filter. Therefore, costs can be further reduced on the basis of implementation of natural heat dissipation of the whole system.

Certainly, although no fan is disposed inside the system for heat dissipation, the charging pile provided in Embodiment 1 of this solution may further include a waterproof fan. The water-proof fan may be disposed outside the power system and configured to dissipate heat of the heat sink or a fin of the heat sink, so as to further strengthen a heat dissipation capability of the charging pile.

On the basis of the foregoing embodiment, further, the power system may be mounted on the ground by using the heat sink as a support, or the power system may be hung on a wall or a pillar by using the heat sink, so as to strengthen a heat dissipation capability of the power system.

It should be further noted that in comparison with a conventional charging pile, in the charging pile provided in this embodiment of the present invention, the power system may be protected by using an IP65 protection design. Because a protection level IP65 is higher than a protection level IP54, a dust filter may not be disposed in the charging pile provided in this embodiment of the present invention. Therefore, no dust filter needs to be regularly replaced, and a failure rate of a power unit is significantly decreased, thereby greatly reducing maintenance costs of the charging pile.

The protection level IP54 is explained as follows: I and P are mark letters, a digit 5 is a first mark digit, a digit 4 is a second mark digit, the first mark digit represents a level of protection against contact and extraneous material, and the second mark digit represents a waterproof protection level. The protection level IP65 is usually used for industrial application, and a top protection level is IP68. IP54 is a low protection level.

Figure 4:
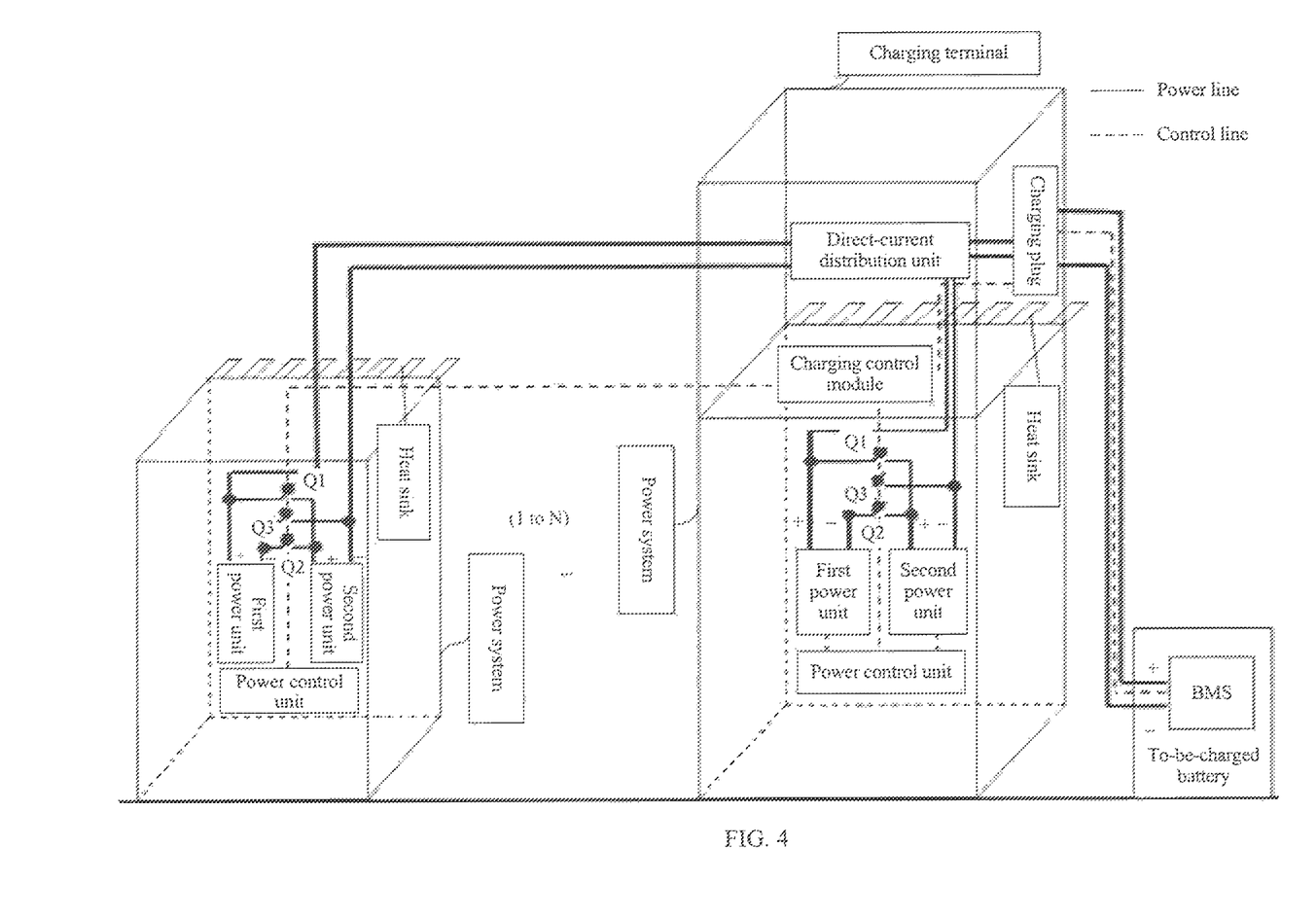
FIG. 4 shows a structural diagram of another charging pile according to an embodiment of the present invention.

On the basis of the charging pile of FIG. 3 provided in this embodiment of the present invention, an embodiment of the present invention further provides a charging pile as shown in FIG. 4. The charging pile of FIG. 4 includes at least two power systems. (1 to N) in the diagram indicates that the charging pile may include N power systems, and N is greater than or equal to 2. In each power system, each power unit is connected to a direct-current distribution unit in a manner described in Embodiment 1, so as to implement large-capacity expansion.

Figure 5:
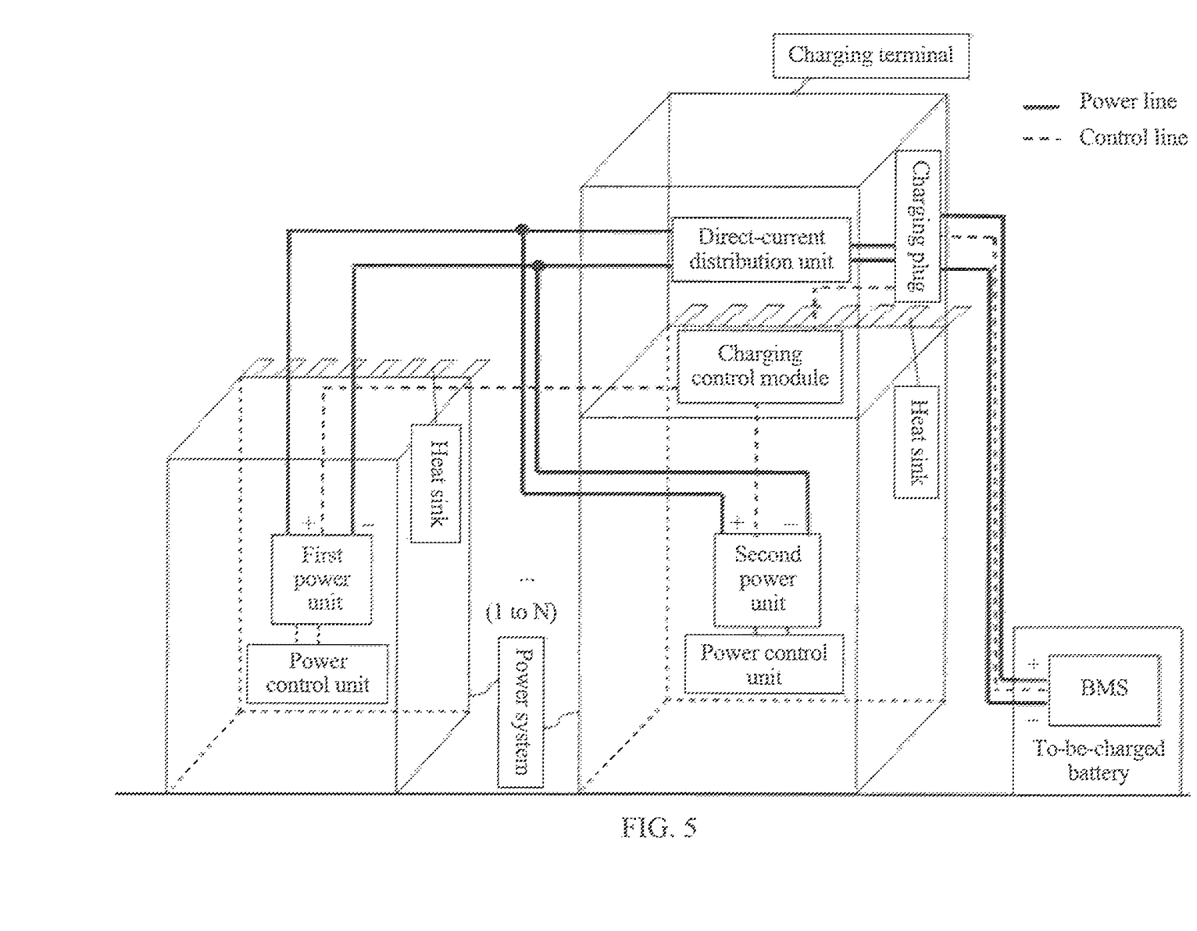
FIG. 5 shows a structural diagram of still another charging pile according to an embodiment of the present invention.

FIG. 5 shows a charging pile according to Embodiment 1 of the present invention. The charging pile includes a power system and a charging terminal.

The power system includes a first power unit, a second power unit, a power control unit, and a heat sink. The first power unit is connected to the second power unit, and the first power unit and the second power unit have a same output voltage value U and a same output current value I. The power control unit is configured to control output voltages and output currents of the first power unit and the second power unit. The heat sink is configured to dissipate heat of the power system.

The charging terminal includes a charging control module, a direct-current distribution unit, and a charging plug. The charging plug is configured to connect to a to-be-charged battery and charge the to-be-charged battery, the direct-current distribution unit is configured to allocate a power supply to the charging plug, and the charging control module is configured to bill and display the charging.

The charging pile provided in this embodiment of the present invention includes the first power unit, the second power unit, the power control unit, and the like, and the two power units are connected to provide a flexible charging voltage and a flexible charging current for the to-be-charged battery. In this way, an existing difficulty in capacity expansion of a charging pile is overcome, and an increasingly high requirement of an electric vehicle for a charging voltage and a charging current is met.

It should be noted that the first power unit and the second power unit may be connected in parallel or in series. An example in FIG. 5 shows a parallel connection.

The charging pile provided in this embodiment of the present invention includes the first power unit, the second power unit, the power control unit, and the like, and the two power units are connected in series or in parallel to provide a flexible charging voltage and a flexible charging current for the to-be-charged battery. In this way, an existing difficulty in capacity expansion of a charging pile is overcome, and an increasingly high requirement of an electric vehicle for a charging voltage and a charging current is met.

Figure 6:
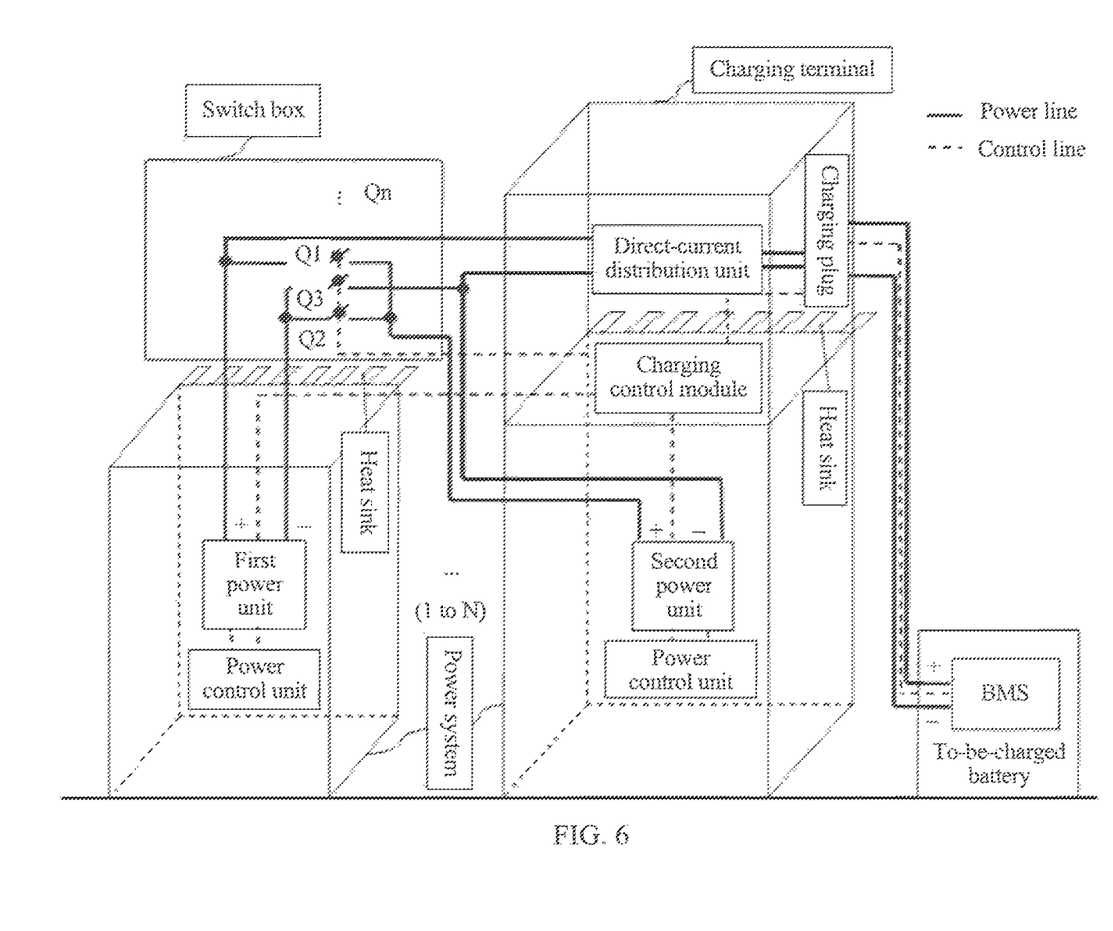
FIG. 6 shows a structural diagram of yet another charging pile according to an embodiment of the present invention.

On the basis of the charging pile of FIG. 5 provided in this embodiment of the present invention, a charging pile of FIG. 6 may be an optional implementation. In addition to all components included in the charging pile of FIG. 5, the charging pile of FIG. 6 may include a first switch transistor Q1, a second switch transistor Q2, and a third switch transistor Q3.

In this optional implementation, the three switch transistors are configured to implement a serial connection or a parallel connection between the first power unit and the second power unit.

A first end of the first switch transistor Q1 is connected to a first end of the first power unit and the direct-current distribution unit, a second end of the first switch transistor Q1 is connected to a first end of the second power unit, a first end of the second switch transistor Q2 is connected to a second end of the first power unit, a second end of the second switch transistor Q2 is connected to the first end of the second power unit and the second end of the first switch transistor Q1, a first end of the third switch transistor Q3 is connected to the second end of the first power unit and the first end of the second switch transistor Q2, and a second end of the third switch transistor Q3 is connected to a second end of the second power unit and the direct-current distribution unit.

Serial and parallel connections between the two power units can be flexibly implemented when the three switch transistors are connected in the foregoing manner, so that a charging voltage and a charging current of the charging pile can be flexibly expanded.

It should be noted that the three switch transistors may be disposed inside the power system, or may be disposed outside the power system as a switch module similar to a switch box. This is not limited in this embodiment of the present invention.

In another optional implementation, the charging pile may include the following three working modes:

a first working mode: a charging mode in which the first power unit and the second power unit are connected in parallel;

a second working mode: a charging mode in which the first power unit and the second power unit are connected in series; and a third working mode: a hybrid charging mode in which the first power unit and the second power unit are first connected in parallel and then are connected in series.

The charging pile in the three different working modes provides different services for the to-be-charged battery according to different requirements. When a requirement of a to-be-charged battery of an electric vehicle for a charging voltage and a charging current changes, the charging pile may correspondingly act based on the three different working modes.

The following separately describes trigger conditions and specific control logic of the three different working modes.

1. When the charging plug is connected to the to-be-charged battery, the charging control module communicates with a battery management system (BMS) of the to-be-charged battery and identifies a charging voltage of the to-be-charged battery and a charging current required by the to-be-charged battery; and when a range of the charging voltage falls within a value range of U and the charging current required by the to-be-charged battery is greater than or equal to a first preset threshold, the charging control module communicates with the power control unit, and the power control unit controls the second switch transistor Q2 to be opened and controls the first switch transistor Q1 and the third switch transistor Q3 to be closed, so that the charging pile enters the first working mode.

In addition, the power control unit adjusts the output voltages and the output currents of the first power unit and the second power unit, so that the to-be-charged battery is charged with a large current (greater than or equal to the first preset threshold), and the to-be-charged battery can be quickly fully charged. In the charging process, the currents of the first power unit and the second power unit need to be equal to maintain load balance. After the charging ends, all of the first switch transistor Q1, the second switch transistor Q2, and the third switch transistor Q3 are opened.

2. Alternatively, when the charging plug is connected to the to-be-charged battery, the charging control module communicates with a battery management system BMS of the to-be-charged battery and identifies a charging voltage of the to-be-charged battery and a charging current required by the to-be-charged battery; and when a range of the charging voltage exceeds a value range of U and is less than an output voltage obtained after the first power unit and the second power unit are connected in series, and the charging current required by the to-be-charged battery is less than I, the charging control module communicates with the power control unit, and the power control unit controls the second switch transistor Q2 to be closed and controls the first switch transistor Q1 and the third switch transistor Q3 to be opened, so that the charging pile enters the second working mode.

In addition, the power control unit adjusts the output voltages and the output currents of the first power unit and the second power unit, so as to meet a charging requirement of the to-be-charged battery. In the charging process, the output voltages of the first power unit and the second power unit are the same to maintain load balance. After the charging ends, all of the first switch transistor Q1, the second switch transistor Q2, and the third switch transistor Q3 are opened.

3. Alternatively, when the charging plug is connected to the to-be-charged battery, the charging control module communicates with a battery management system BMS of the to-be-charged battery and identifies a charging voltage of the to-be-charged battery and a charging current required by the to-be-charged battery; when a range of the charging voltage exceeds a value range of U and the charging current required by the to-be-charged battery is greater than I, the charging control module communicates with the power control unit, and the power control unit controls the second switch transistor Q2 to be opened and controls the first switch transistor Q1 and the third switch transistor Q3 to be closed, so that the first power unit and the second power unit perform output in parallel, and the power control unit adjusts the output voltages and the output currents of the first power unit and the second power unit; and when the charging voltage of the to-be-charged battery reaches a maximum value of U, the power control unit controls the first switch transistor Q1 and the third switch transistor Q3 to be opened and controls the second switch transistor Q2 to be closed, so that the first power unit and the second power unit perform output in series, and the charging pile enters the third working mode. The output current is adjusted, so that the output current can satisfy the charging current required by the to-be-charged battery, and furthermore, it can be ensured that the output current does not exceed a capacity of the to-be-charged battery.

In addition, the power control unit adjusts the output voltages and the output currents of the first power unit and the second power unit, so as to meet a charging requirement of the to-be-charged battery. In the charging process, the output voltages of the first power unit and the second power unit are the same to maintain load balance. After the charging ends, all of the first switch transistor Q1, the second switch transistor Q2, and the third switch transistor Q3 are opened.

In comparison with a conventional solution, in the foregoing three working modes, output voltages and output currents of different power units can be flexibly combined, so as to make full use of the power units and enable the charging pile to work in an optimal state with lowest costs. Based on the above, when to-be-charged batteries of different electric vehicles have different requirements for a charging voltage and a charging current, the charging control module identifies the requirements of the to-be-charged batteries and controls the three switch transistors according to specific requirements of the to-be-charged batteries. In this way, the two power units of the charging pile are connected in different manners, so that the charging pile enters a corresponding working mode in the three working modes, so as to charge the to-be-charged batteries.

Certainly, as described above, alternatively, the charging pile provided in this embodiment of the present invention may not include the three switch transistors. The first two working modes may be separately implemented by using a serial connection design or a parallel connection design. That is, in a manner shown in FIG. 5, the first power unit and the second power unit are directly connected in parallel to implement the first working mode. Similarly, the first power unit and the second power unit may be directly connected in series to implement the second working mode. That is, in the charging pile of FIG. 6 provided in this embodiment of the present invention, serial and parallel connections between power units can be directly implemented without using a switch, and details are not described herein.

Further, in the charging pile provided in Embodiment 2, both a power heater of the first power unit and a power heater of the second power unit are mounted on the heat sink. In this way, heat can be dissipated by using the heat sink without a need to dispose a fan inside the whole system. Compared with existing direct ventilation for heat dissipation, heat dissipation performed in this manner does not require a dust filter. Therefore, costs can be further reduced on the basis of implementation of natural heat dissipation of the whole system.

It should be further noted that in comparison with a conventional charging pile, in the charging pile of FIG. 5 or FIG. 6 provided in this embodiment of the present invention, the power system may be protected by using an IP65 protection design. Because a protection level IP65 is higher than a protection level IP54, a dust filter may not be disposed in the charging pile of FIG. 5 or FIG. 6 provided in this embodiment of the present invention. Therefore, no dust filter needs to be regularly replaced, and a failure rate of a power unit is significantly decreased, thereby greatly reducing maintenance costs of the charging pile.

It should be noted that in the charging pile shown in FIG. 5, the whole power system may include multiple power subsystems, and each power subsystem (that is a "power system" shown in the diagram) may include only one power unit. Power units in each power subsystem are connected in series or in parallel by using a switch transistor or without using a switch transistor, and are connected to the direct-current distribution unit to supply power to the charging terminal. That is, the power system in the charging pile of FIG. 5 may be considered as a large power system. The large power system includes multiple power units, and each power unit is included in a separate power subsystem. Each power subsystem may include an independent power control unit, configured to control an output voltage and an output current of a power unit in the power subsystem, and may further include a related component such as an independent heat sink. In other words, in addition to at least two power units, one large power system may include at least two corresponding power control units, a heat sink, and the like. In this case, the large power system may be considered as the power system described in claims, and details are not described herein.

The charging pile provided in embodiments of the present invention is described in detail above. The principle and implementation of the present invention are described herein by using specific examples. The description about embodiments of the present invention is merely provided to help understand the present invention. A person of ordinary skill in the art can make variations and modifications to the present invention in terms of the specific implementations and application scopes according to the ideas of the present invention. Therefore, the content of specification shall not be construed as a limit to the present invention.

Additionally, statements made herein characterizing the invention refer to an embodiment of the invention and not necessarily all embodiments.

What is claimed is:

1. A charging pile, comprising:
    a power system; and
    a charging terminal;
    wherein the power system comprises a first power unit, a second power unit, a power control unit, a heat sink, a first switch transistor, a second switch transistor, and a third switch transistor, wherein the first power unit and the second power unit have a same output voltage value U and a same output current value I, wherein the power control unit is configured to control output voltages and output currents of the first power unit and the second power unit, wherein the first switch transistor, the second switch transistor, and the third switch transistor are configured to implement a serial connection in a first configuration and a parallel connection between the first power unit and the second power unit in a second configuration, and wherein the heat sink is configured to dissipate heat of the power system;
    wherein the charging terminal comprises a charging control module, a direct-current distribution unit, and a charging plug, wherein the charging plug is configured to connect to a to-be-charged battery, communicate with a battery management system (BMS) of the to-be-charged battery, identify a charging voltage of the to-be-charged battery and a charging current required by the to-be-charged battery and charge the to-be-charged battery, wherein the direct-current distribution unit is configured to allocate a power supply to the charging plug, and wherein the charging control module is configured to bill and display the charging; and
    wherein the charging control module is configured to:
    in response to a range of the charging voltage falling within a value range of U and the charging current required by the to-be-charged battery is greater than or equal to a first preset threshold, communicate with the power control unit such that the power control unit controls the second switch transistor to be opened and controls the first switch transistor and the third switch transistor to be closed, so that the charging pile enters the first working mode;
    in response to a range of the charging voltage exceeding the value range of U and is less than an output voltage obtained after the first power unit and the second power unit are connected in series, and the charging current required by the to-be-charged battery is less than I, communicate with the power control unit such that the power control unit controls the second switch transistor to be closed and controls the first switch transistor and the third switch transistor to be opened, so that the charging pile enters the second working mode; and
    in response to a range of the charging voltage exceeding the value range of U and the charging current required by the to-be-charged battery is greater than I, communicate with the power control unit such that the power control unit controls the second switch transistor to be opened and controls the first switch transistor and the third switch transistor to be closed, so that the first power unit and the second power unit perform output in parallel and the power control unit adjusts the output voltages of the first power unit and the second power unit.

2. The charging pile according to claim 1, wherein a first end of the first switch transistor is connected to a first end of the first power unit and the direct-current distribution unit, wherein a second end of the first switch transistor is connected to a first end of the second power unit, wherein a first end of the second switch transistor is connected to a second end of the first power unit, wherein a second end of the second switch transistor is connected to the first end of the second power unit and the second end of the first switch transistor, wherein a first end of the third switch transistor is connected to the second end of the first power unit and the first end of the second switch transistor, and wherein a second end of the third switch transistor is connected to a second end of the second power unit and the direct-current distribution unit.

3. The charging pile according to claim 2, wherein the charging pile is configured to operate in at least three working modes, wherein the at least three working modes comprise:
  a first working mode in which the first power unit and the second power unit are connected in parallel;
  a second working mode in which the first power unit and the second power unit are connected in series; and
  a third working mode in which the first power unit and the second power unit are first connected in parallel and then are connected in series.

4. The charging pile according to claim 3,
  wherein the power control unit is configured to:
    when the charging voltage of the to-be-charged battery reaches a maximum value of U, control the first switch transistor and the third switch transistor to be opened and control the second switch transistor to be closed, so that the first power unit and the second power unit perform output in series, and the charging pile enters the third working mode.

5. The charging pile according to claim 1, wherein the charging terminal is disposed on top of or on one side of the power system and forms a unified charging pile with the power system; or
  wherein the charging terminal is independently disposed on the ground and forms a split charging pile with the power system.

6. The charging pile according to claim 1, wherein the first switch transistor, the second switch transistor, and the third switch transistor include a metal-oxide-semiconductor field-effect transistor (MOSFET), an insulated-gate bipolar transistor (IGBT), a contactor, and/or a relay.

7. The charging pile according to claim 1, wherein both a power heater of the first power unit and a power heater of the second power unit are mounted on the heat sink.

8. The charging pile according to claim 7, wherein the charging pile further comprises a waterproof fan, and the waterproof fan is disposed outside the power system and is configured to dissipate heat of the heat sink.

9. The charging pile according to claim 1, wherein the power system is disposed on the ground by using the heat sink as a support, or the power system is hung on a wall or a pillar by using the heat sink.

10. The charging pile according to claim 1, wherein the power system is protected by using an IP65 protection design.

11. A charging pile, comprising:
  a power system; and
  a charging terminal;
  wherein the power system comprises a first power unit, a second power unit, a power control unit, and a heat sink, wherein the first power unit is connected to the second power unit, wherein the first power unit and the second power unit have a same output voltage value U and a same output current value I, wherein the power control unit is configured to control output voltages and output currents of the first power unit and the second power unit, and wherein the heat sink is configured to dissipate heat of the power system; and
  wherein the charging terminal comprises a charging control module, a direct-current distribution unit, and a charging plug, wherein the charging plug is configured to connect to a to-be-charged battery, communicate with a battery management system (BMS) of the to-be-charged battery, identify a charging voltage of the to-be-charged battery and a charging current required by the to-be-charged battery and charge the to-be-charged battery, wherein the direct-current distribution unit is configured to allocate a power supply to the charging plug, and wherein the charging control module is configured to bill and display the charging; and
  wherein the charging control module is configured to:
    in response to a range of the charging voltage falling within a value range of U and the charging current required by the to-be-charged battery is greater than or equal to a first preset threshold, communicate with the power control unit such that the power control unit controls the second switch transistor to be opened and controls the first switch transistor and the third switch transistor to be closed, so that the charging pile enters the first working mode;
    in response to a range of the charging voltage exceeding the value range of U and is less than an output voltage obtained after the first power unit and the second power unit are connected in series, and the charging current required by the to-be-charged battery is less than I, communicate with the power control unit such that the power control unit controls the second switch transistor to be closed and controls the first switch transistor and the third switch transistor to be opened, so that the charging pile enters the second working mode; and
    in response to a range of the charging voltage exceeding the value range of U and the charging current required by the to-be-charged battery is greater than I, communicate with the power control unit such that the power control unit controls the second switch transistor to be opened and controls the first switch transistor and the third switch transistor to be closed, so that the first power unit and the second power unit perform output in parallel, and the power control unit adjusts the output voltages of the first power unit and the second power unit.

12. The charging pile according to claim 11, wherein the first power unit and the second power unit are connected in parallel in a first configuration of the charging pile, and the first power unit and the second power unit are connected in series in a second configuration of the charging pile.

13. The charging pile according to claim 12, wherein the charging pile further comprises a first switch transistor, a second switch transistor, and a third switch transistor, and the first switch transistor, the second switch transistor, and the third switch transistor are configured to implement a serial connection and a parallel connection between the first power unit and the second power unit, wherein a first end of the first switch transistor is connected to a first end of the first power unit and the direct-current distribution unit, wherein a second end of the first switch transistor is connected to a first end of the second power unit, wherein a first end of the second switch transistor is connected to a second end of the first power unit, wherein a second end of the second switch transistor is connected to the first end of the second power unit and the second end of the first switch transistor, wherein a first end of the third switch transistor is connected to the second end of the first power unit and the first end of the second switch transistor, and wherein a second end of the third switch transistor is connected to a second end of the second power unit and the direct-current distribution unit.

14. The charging pile according to claim 13, wherein the charging pile is configured to operate in at least three working modes:

a first working mode in which the first power unit and the second power unit are connected in parallel;

a second working mode in which the first power unit and the second power unit are connected in series; and a third working mode in which the first power unit and the second power unit are first connected in parallel and then are connected in series.

15. The charging pile according to claim 14, wherein the power control unit is configured to:

when the charging voltage of the to-be-charged battery reaches a maximum value of U, control the first switch transistor and the third switch transistor to be opened and control the second switch transistor to be closed, so that the first power unit and the second power unit perform output in series, and the charging pile enters the third working mode.

16. The charging pile according to claim 11, wherein the power system is protected by using an IP65 protection design.

\* \* \* \* \*